United States Patent [19]

Shu

[11] Patent Number: 4,834,180

[45] Date of Patent: * May 30, 1989

[54] AMINO RESINS CROSSLINKED POLYMER GELS FOR PERMEABILITY PROFILE CONTROL

[75] Inventor: Paul Shu, Princeton Junction, N.J.

[73] Assignee: Mobil Oil Corporation, New York, N.Y.

[ * ] Notice: The portion of the term of this patent subsequent to Jan. 5, 2005 has been disclaimed.

[21] Appl. No.: 917,324

[22] Filed: Oct. 9, 1986

[51] Int. Cl.$^4$ ............................................ E21B 33/138
[52] U.S. Cl. ..................................... 166/270; 166/246; 166/295; 252/8.551; 523/130
[58] Field of Search .................... 252/8.551, 8.554; 166/270, 274, 295, 246; 523/130

[56] References Cited

U.S. PATENT DOCUMENTS

| | | | |
|---|---|---|---|
| 3,900,406 | 8/1975 | Clampitt et al. | 252/8.554 X |
| 3,918,521 | 11/1975 | Snavely, Jr. et al. | 166/272 |
| 4,157,322 | 6/1979 | Colegrove . | |
| 4,342,866 | 8/1982 | Kang et al. | 252/8.51 |
| 4,349,443 | 9/1982 | Block | 252/8.51 |
| 4,461,351 | 7/1984 | Falk | 166/295 |
| 4,479,894 | 10/1984 | Chen et al. . | |
| 4,489,783 | 12/1984 | Shu | 166/272 |
| 4,498,540 | 2/1985 | Marrocco | 523/130 X |
| 4,513,821 | 4/1985 | Shu | 166/273 |
| 4,565,249 | 1/1986 | Pebdani et al. | 166/303 |
| 4,613,631 | 9/1986 | Espenscheid | 523/130 |
| 4,658,898 | 4/1987 | Paul et al. | 523/130 X |
| 4,673,038 | 6/1987 | Sandiford et al. | 166/270 |
| 4,716,966 | 1/1988 | Shu | 166/295 |

Primary Examiner—Herbert G. Guynn
Attorney, Agent, or Firm—Alexander J. McKillop; Charles J. Speciale; Charles A. Malone

[57] ABSTRACT

A composition of matter wherein amino resins such as melamine formaldehyde ("MF") resins co-gel and crosslink with polymers useful for profile control where said polymers have amine, amide, hydroxyl and thiol functionalities. Resulting gels are useful as profile control agents for high temperature reservoirs during a water-flooding operation.

14 Claims, No Drawings

AMINO RESINS CROSSLINKED POLYMER GELS FOR PERMEABILITY PROFILE CONTROL

This application is related to copending application Ser. Nos. 922,916 and 940,682, filed on Oct. 24, 1986 and Dec. 11, 1986, respectively.

FIELD OF THE INVENTION

This invention relates to novel gels resultant from melamine formaldehyde and other amino resins as general gelants for polymers containing hydroxyl, amino, amide, and thiol functionalities. Resultant gels are useful as profile control agents for high temperature reservoirs.

BACKGROUND OF THE INVENTION

One of the major problems encountered in the water-flooding of permeability-stratified reservoirs is the preferential flow of water through the more permeable zones between injector and producer wells. This preferential flow greatly reduces the sweep efficiency of driving fluids. This reduction in sweep efficiency can also occur in steam and miscible $CO_2$-flooding processes.

To improve sweep efficiency, the permeability of such zones must be reduced. This technique is commonly known as proflie control. Polymer gels are often placed into high permeability zones to impede the flow rate through such zones.

Metal-complexed polymer gels are widely used for profile control. For example, Al(III) and Cr(III) are used to crosslink polyacrylamide. Other metal ions, such as Ti(IV), Zr(IV), Fe(III), etc., are also useful as gelants for polymers.

Several limitations may interfere with the use of metal ions in the preparation of gels for profile control. One limitation is that each metal is reactive only to certain functionalities. For example, Al, Cr, and Zr are reactive to amide and carboxyl groups, while Ti is reactive to hydroxyl groups. A proper match of the polymer with the appropriate metal crosslinker must be considered. There is no presently known general metal crosslinker for all polymer types. Carbonate, bicarbonate, and sulfate anions are known to interfere with the gelation of Cr, Zr, and Al. Another limitation is that pH control is important for most metal crosslinking reactions. It is easy to control the pH when the gel is prepared above surface but difficult to do when an in-situ gelation process is ued. Furthermore, ligand-metal bond formation and stability may be affected by high ionic strength and the temperature of reservoir brine. At substantialy high brine concentrations and high temperatures, metal-ligand bonds can dissociate due to unfavorable equilibria.

Therefore, what is needed are economical amino resins which will co-gel and crosslink covalently with all polymers known to be useful for profile control where said polymers contain amine, amide, hydroxyl, or thiol functionalities. The utilized gelation reaction should proceed under all pH conditions; should not require an acid or base to catalyze; and should not be affected by reservoir brine. The resultant linkages should be stable at substantially high temperatures and high salinities.

SUMMARY OF THE INVENTION

This invention is directed to a composition of matter comprising an aminoplast resin containing a methyol group and its alkylated varieties which are reactive with a polymer having at least one functional group selected from a member of the group consisting of an amine, an amide, a hydroxyl, or a thiol. Said methyol group and its alkylated varieties contained on said resin can condense to form a cured resin.

Said aminoplast resin and said polymer form a gel which is useful in producing hydrocarbonaceous fluids from a reservoir containing same and greatly improves the sweep efficiency of driving fluids. Sweep efficiencies are also improved in water flood, steam flood, and miscible carbon dioxide flood processes.

It is therefore an object of this invention to provide for economical aminoplast resins which will co-gel and crosslink with all polymers useful for profile control.

It is another object of this invention to provide a gelation reaction which can proceed under all pH conditions encountered in a hydrocarbonaceous reservoir.

It is a yet further object of this invention to provide for a substantially stable gel when high temperatures are encountered in a reservoir.

It is a still yet further object of this invention to provide for a gelation reaction which will proceed in a saline hydrocarbonaceous reservoir environment.

DESCRIPTION OF THE PREFERRED EMBODIMENTS

In the practice of this invention, a melamine formaldehyde ("MF") resin is formed as a reaction product of melamine and formaldehyde. Said resin is known as an aminoplast or amino resin which comprises a class of thermo-setting resins made by the reaction of an amine with an aldehyde. The resultant resin is reacted with a crosslinkable polymer in an aqueous medium under all pH conditions and needs no catalyst. Said polymer has at least one functional group selected from a member of the group consisting of an amine, an amide, a hydroxyl, or a thiol group. This reaction can be carried out at ambient conditions, and also under conditions occurring in a subterranean hydrocarbonaceous formation. The gel resultant from said reaction can be used in the recovery of hydrocarbonaceous fluids from a formation containing same.

These gels are novel in that they are unaffected by high saline concentrations often encountered in oil reservoirs. High temperatures encountered in said reservoirs do not adversely affect said gels. Carbonate, bicarbonate, and sulfate anions encountered in oil reservoirs which are known to affect certain metal crosslinked gels, but do not affect these novel gels. These novel gels can be formed under all pH conditions and are particularly useful in pH conditions of 10 or less. A method for making a kindred gel is discussed in U.S. Pat. No. 4,157,322 which issued to Colegrove on June 5, 1979. Unlike Colegrove, the instant gelation reaction is not catalyzed by a salt which is acid generating upon the application of heat. This patent is hereby incorporated by reference.

Polymers having functional groups such as $NH_2$, $-CONH_2$, $-OH$, $-SH$ can be gelled with methylated, MF resins. Some acceptable polymers include polyacrylamide, Kelco's S-130 biopolymer, acrylamide modified polyvinyl alcohol ("AMPVA"), Xanthan biopolymers, poly (acrylamide-co-acryl-amido-2-methyl-propanesulfonate) "AM-AMPS", "Phillips HE" polymers (a family of acrylamide containing copolymers), and polyvinyl alcohol. Polymers mentioned in U.S. Pat. No. 4,157,322, supra, may be utilized as long as those polymers contain the functional groups above mentioned. Polymer concentration in said gels range from about 0.1 to about 5.0 wt. percent. These polymer concentrations vary depending upon the molecular weight of polymer used. Lower molecular weight polymers require a higher polymer concentration to gel. A polymer concentration of about 0.2–5.0 wt. percent is preferred. This crosslinking/co-gelation method produces high integrity polymer gels able to withstand high temperatures and high salinity conditions often found in subterranean hydrocarbonaceous formations.

Methylated MF derived as a reaction product of melamine and formaldehyde has a molar ratio of between 1-6. A ratio of 3-6 is commonly found in commercial resins. The methyol group, $-CH_2OH$ and its methylated varieties are reactive to various functional groups such as $NH_2$, $-CONH_2$, $-OH$, $-SH$ and can also self-condense to form cured resins. Its preparation is convenient and well documented in preparative polymer manuals.

The melamine resin that is utilized in this invention can be a commercial product such as Cyanamid's Parez ® resins. Included among these melamine-formaldehyde (melamine) resins which are useful in this invention are the partially methylated resins and the hexamethoxymethyl resins (i.e. American Cyanamid's Parez, Cymel ™ 373, Cymel 370, Cymel 303, and Cymel 380). The resin, however, has to be one that is soluble or dispersible in an aqueous medium. Other amino resins can also be used. Non-limiting examples are urea-formaldehyde, ethylene and propylene urea formaldehyde, triazone, uron, and glyoxal resins. The amount of MF resins required for adequate gel formation is in the ratio of 10:1–1:10 polymer to amino resins. Preferred polymer concentrations are from about 0.2 to about 5.0 wt. percent. Amino resins are preferred crosslinkers because they (1) are economical to use; (2) can be applied to a wide variety of polymers; (3) form thermally stable, brine tolerant gels; and (4) do not need an acid or base catalyst.

The gelation rate of the composition depends on the amount of each of the components and the temperature at which the reaction is conducted. Thus, one can tailor the gel rate and gel strength of the composition by adjusting the amount of the polymer, the resin amount and the temperature. The higher temperature at given concentrations of resin and polymer will result in a faster gelation time. If a thicker gelled composition is desired, the polymer and resin concentrations may be increased for a given temperature.

Gels resultant from the gelation reaction were formed in about a 15 to 30 wt. % brine solution containing at least about 1500 ppm Ca(II) and at least about 500 ppm Mg(II). Said formed gels were stable as determined by sustained gel integrity and low gel shrinkage at least about 195° F. for at least three months. Examples of preferred gel compositions are set forth below.

| Gelation of Melamine - Formaldehyde Crosslinker | | | | |
|---|---|---|---|---|
| Example | Polymer | 30% Brine[8] | Deionized Water | Parez 613[1] |
| | 10% AMPVA[2] | | | |
| #1 | 5 g | 5 g | 0 | 0.4 g |
| #2 | 2.5 g | 5 g | 2.5 g | 0.4 g |
| | AMPS-AMPVA[3] 10% | | | |
| #3 | 2.5 g | 5 g | 2.5 g | 0.4 g |
| #4 | 5 g | 5 g | 0 | 0.4 g |
| | PVA[4] 5% | | | |
| #5 | 5 g | 2.5 g | 2.5 g | 0.4 g |
| | AMPS-PVA[5] 10% | | | |
| #6 | 5 g | 2.5 g | 2.5 g | 0.4 g |
| | Magnifloc[6] 1% | | | |
| #7 | 5 g | 5 g | 0 | 0.4 g |
| #8 | 5 g | 2.5 g | 2.5 g | 0.4 g |
| | AM-AMPS[7] 1% | | | |
| #9 | 5 g | 5 g | 0 | 0.4 g |
| #10 | 2.5 g | 5 g | 2.5 g | 0.4 g |

| Gelation with Trimethylolmelamine (TM) | | | | |
|---|---|---|---|---|
| Example | Polymer | 30% Brine[8] | Deionized Water | TM |
| | S-130 1%[9] | | | |
| #11 | 5 g | 5 g | — | 0.4 g |
| #12 | 5 g | 5 g | | 0.2 g |
| | HE B 2%[10] | | | |
| #13 | 2.5 g | 5 g | 2.5 g | 0.4 g |
| #14 | 2.5 g | 5 g | 2.5 g | 0.4 g |
| | HE E 2% | | | |
| #15 | 2.5 g | 5 g | 2.5 g | 0.4 g |
| #16 | 2.5 g | 5 g | 2.5 g | 0.2 g |
| | Xanthan[11] 2% | | | |
| #17 | 2.5 g | 5 g | 2.5 g | 0.4 g |
| #18 | 2.5 g | 5 g | 2.5 g | 0.2 g |

[1] A commercial 80% active amino resin obtainable from American Cyanamid
[2] Acrylamide modified polyvinyl alcohol
[3] Acrylamido-2-methyl-propanesulfonate/acrylamide modified polyvinyl alcohol
[4] Polyvinyl alcohol
[5] Acrylamido-2-methyl-propanesulfonate/polyvinyl alcohol
[6] Polyacrylamide obtained from American Cyanamid
[7] Poly (acrylamide-co-acrylamido-2-methyl-propanesulfonate)
[8] 30% NaCl, 2000 ppm Ca, 1000 ppm Mg
[9] Kelco "S-130" biopolymer
[10] Phillips HE
[11] Pfizer Flocon biopolymer Where it is desired to obtain increased sweep efficiency, gels of this invention can be used to plug a previously sweep portion of a formation. Said gels can be directed to areas of increased porosity by utilization in any of the below methods.

One method where gels of this invention can be utilized is during a waterflooding process for the recovery of oil from a subterranean formation. After plugging the more permeable zones of a reservoir with the novel gels of this invention, a waterflooding process can be commenced. U.S. Pat. No. 4,479,894, issued to Chen et al., describes one such waterflooding process. This patent is hereby incorporated by reference in its entirety.

Steamflood processes which can be utilized when employing the gels described herein are detailed in U.S. Pat. Nos. 4,489,783 and 3,918,521 issued to Shu and Snavely, respectively. These patents are hereby incorporated by reference herein.

Gels described herein can also be used in conjunction with a cyclic carbon dioxide steam stimulation in a heavy oil recovery process to obtain greater sweep efficiency. Cyclic carbon dioxde steam stimulation can be commenced after plugging the more permeable zones of the reservoir with the novel gels of this invention. A suitable process is described in U.S. Pat. No. 4,565,249 which issued to Pebdani et al. This patent is hereby incorporated by reference in its entirety. Increased sweep efficiency can be obtained when the subject gels are used in combination with a carbon dioxide process by lowering the carbon dioxide minimum miscibility pressure ("MMP") and recovering oil. Prior to commencement of the carbon dioxide process, the more permeable zones are plugged with these novel gels. Carbon dioxide MMP in an oil recovery process is described in U.S. Pat. No. 4,513,821 issued to Shu which is hereby incorporated by reference.

Although the present invention has been described with preferred embodiments, it is to be understood that modifications and variations may be resorted to without departing from the spirit and scope of this invention, as those skilled in the art will readily understand. Such modifications and variations are considered to be within the purview and scope of the appended claims.

What is claimed is:

1. A process for closing pores in a hydrocarbonaceous fluid bearing formation to obtain improved sweep efficiency during a waterflood oil recovery operation which comprises injecting a gellable composition comprising:
   (a) water;
   (b) 0.2 to 5.0 wt. percent of a cross linkable polymer which is a member selected from the group consisting of xanthan biopolymers, heteropolysaccharide S-130, poly (acrylamide-co-acrylamido-2-methyl-propanesulfonate), and acrylamide modified polyvinyl alcohol; and
   (c) 0.02 to 50.0 wt. percent of a partially methylated aminoplast resin which cross links with said polymer thereby forming a gel in the absence of a salt which is acid generating upon the application of heat which gel is of a strength sufficient to close pores in one or more permeable zones of said formation.

2. The process as recited in claim 1 wherein said resin is a member selected from the group consisting of melamine-formaldehyde, urea formaldehyde, ethylene urea formaldehyde, propylene urea formaldehyde, triazone, uron, and glyoxal.

3. The process as recited in claim 1 wherein the ratio of polymer to said resin required for gelation is from about 10:1 to about 1:10.

4. The process as recited in claim 1 wherein said gel is formed under salinity concentrations encountered in an oil reservoir.

5. The process as recited in claim 1 wherein said gel is of a stability sufficient to withstand high temperatures encountered in an oil reservoir for at least three months.

6. The process as recited in claim 1 wherein said gel is unaffected by carbonate, bicarbonate, and sulfate anions encountered in an oil reservoir.

7. The process as recited in claim 1 wherein said resin can condense to form a cured resin.

8. A process for closing pores in a hydrocarbonaceous fluid bearing formation to obtain improved sweep efficiency during a carbon dioxide oil recovery operation which comprises injecting a gellable composition comprising:
   (a) water;
   (b) 0.2 to 5.0 wt. percent of a cross linkable polymer which is a member selected from the group consisting of xanthan biopolymers, heteropolysaccharide S-130, poly (acrylamide-co-acrylamido-2-methyl-propanesulfonate), and acrylamide modified polyvinyl alcohol; and
   (c) 0.02 to 50.0 wt. percent of a partially methylated aminoplast resin which cross links with said polymer thereby forming a gel in the absence of a salt which is acid generating upon the application of heat which gel is of a strength sufficient to close pores in one or more permeable zones of said formation.

9. The process as recited in claim 8 wherein said resin is a member selected from the group consisting of melamine-formaldehyde, urea formaldehyde, ethylene urea formaldehyde, propylene urea formaldehyde, triazone, uron, and glyoxal.

10. The process as recited in claim 8 wherein the ratio of polymer to said resin required for gelation is from about 10:1 to about 1:10.

11. The process as recited in claim 8 wherein said gel is formed under salinity concentrations encountered in an oil reservoir.

12. The process as recited in claim 8 wherein said gel is of a stability sufficient to withstand high temperatures encountered in an oil reservoir for at least three months.

13. The process as recited in claim 8 wherein said resin can condense to form a cured resin.

14. The process as recited in claim 8 wherein said gel is unaffected by carbonate, bicarbonate, and sulfate anions encountered in an oil reservoir.

* * * * *